US012368648B2

(12) United States Patent
Chan et al.

(10) Patent No.: US 12,368,648 B2
(45) Date of Patent: Jul. 22, 2025

(54) QUERY MECHANISM FOR A NETWORK MANAGEMENT SYSTEM

(71) Applicant: Juniper Networks, Inc., Sunnyvale, CA (US)

(72) Inventors: Chi Fung Michael Chan, Mountain View, CA (US); Diheng Qu, Palo Alto, CA (US); Ilya Kharin, Amsterdam (NL); Georgy Savostyanov, Amstelveen (NL)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/185,326

(22) Filed: Mar. 16, 2023

(65) Prior Publication Data

US 2024/0223467 A1 Jul. 4, 2024

Related U.S. Application Data

(60) Provisional application No. 63/477,712, filed on Dec. 29, 2022.

(51) Int. Cl.
*H04L 41/40* (2022.01)
*G06F 16/901* (2019.01)
(Continued)

(52) U.S. Cl.
CPC .......... *H04L 41/20* (2013.01); *G06F 16/9024* (2019.01); *G06F 16/90335* (2019.01);
(Continued)

(58) Field of Classification Search
CPC ....... H04L 41/12; H04L 41/145; H04L 41/40; H04L 41/5009; H04L 41/5025;
(Continued)

(56) References Cited

U.S. PATENT DOCUMENTS 10,200,248 B1 2/2019 Jiang et al.
10,516,761 B1 12/2019 A et al.
(Continued)

FOREIGN PATENT DOCUMENTS

WO 2022162465 A1 8/2022

OTHER PUBLICATIONS

Extended Search Report from counterpart European Application No. 23170092.3 dated Sep. 18, 2023, 10 pp.
(Continued)

*Primary Examiner* — Tom Y Chang
(74) *Attorney, Agent, or Firm* — Shumaker & Sieffert, P.A.

(57) ABSTRACT

A system comprising one or more processors configured to receive a query indicating one or more of filtering information, sorting information, or joining information and retrieve, from a first datastore, an intent graph for a network, wherein the intent graph comprises nodes representing components of the network and edges representing connections between the components. The one or more processors being further configured to select a subset of a plurality of network devices of the network based on the query and the intent graph retrieved from the first datastore and retrieve, from a second datastore, data received from the plurality of network devices of the network. The one or more processors being further configured to determine a response to the query based on the selected subset of the plurality of network devices and the data retrieved from the second datastore and output the response to the query.

20 Claims, 10 Drawing Sheets

(51) Int. Cl.
   *G06F 16/903*     (2019.01)
   *H04L 41/00*      (2022.01)
   *H04L 41/0873*    (2022.01)
   *H04L 43/0817*    (2022.01)

(52) U.S. Cl.
   CPC .......... *H04L 41/40* (2022.05); *H04L 41/0873* (2013.01); *H04L 43/0817* (2013.01)

(58) Field of Classification Search
   CPC ............. H04L 41/5019; H04L 41/0873; H04L 41/0894; H04L 43/0817
   See application file for complete search history.

(56) References Cited

U.S. PATENT DOCUMENTS

| | | | | |
|---|---|---|---|---|
| 10,992,543 | B1* | 4/2021 | Rachamadugu | H04L 41/0853 |
| 11,165,647 | B2* | 11/2021 | A | G06F 16/212 |
| 11,736,410 | B1* | 8/2023 | Hosamani | H04L 41/082 |
| | | | | 370/254 |
| 11,985,023 | B2* | 5/2024 | A | G06F 16/21 |
| 2004/0236915 | A1* | 11/2004 | Kawamura | H04L 67/1095 |
| | | | | 711/167 |
| 2018/0349482 | A1 | 12/2018 | Oliner et al. | |
| 2019/0182119 | A1* | 6/2019 | Ratkovic | H04L 43/06 |
| 2020/0084120 | A1* | 3/2020 | A | H04L 41/0213 |
| 2020/0326924 | A1* | 10/2020 | A | H04L 41/082 |
| 2021/0149957 | A1 | 5/2021 | Grossman et al. | |
| 2021/0266220 | A1* | 8/2021 | A | H04L 41/0853 |
| 2022/0166679 | A1* | 5/2022 | Hafeez | H04L 41/145 |
| 2022/0286367 | A1* | 9/2022 | Gilbert | G06Q 10/0875 |
| 2022/0393953 | A1* | 12/2022 | A | H04L 41/5051 |
| 2022/0400130 | A1* | 12/2022 | Kapoor | G06F 16/9537 |

OTHER PUBLICATIONS

Enns, "Netconf Configuration Protocol," Network Working Group, RFC 4741, Dec. 2006, 95 pp.

Harrington et al., "An Architecture for Describing Simple Network Management Protocol (SNMP) Management Frameworks," Network Working Group, RFC 3411, Dec. 2002, 64 pp.

Bjorklund, "Yang—A Data Modeling Language for the Network Configuration Protocol (NETCONF)," Internet Engineering Task Force, RFC 6020, Oct. 2010, 173 pp.

Response to Extended Search Report dated Sep. 18, 2023, from counterpart European Application No. 23170092.3 filed Jan. 3, 2025, 26 pp.

* cited by examiner

240 — {
case 1: IBA optical xcvr temp histogram and scatter plot

-current value from IBA probe stage data

SELECT system, ifc, temp
FROM probe.ibaunit.optical.stage-2min-avg
WHERE vendor = "juniper" and model = "QSFP-abc"
}

242 — {
```
system  ifc   temp
=====================
SN-aaa  eth0  67
SN-aaa  eth1  65
SN-bbb  swp1  69
```
}

FIG. 4

```
SELECT model.system, ifc, temp
FROM probe.ibaunit . optical . stage-2min-avg
WHERE vendor = '"juniper"' and (temp < 64 or temp > 68)
GROUP BY model Ordered BY model
```
— 250

```
model      system   ifc    temp
=====================================
QSFP-111   SN-aaa   eth0   62
QSFP-111   SN-bbb   swp0   68
-------------------------------------
QSFP-222   SN-bbb   swp1   69
```
— 252

FIG. 5

-- simple average over a time window based on metricdb

```
SELECT system, ifc, vendor, model, avg(temp)
FROM metricdb.bp- id.optical . stage-2min-avg ~
BETWEEN 2022- 08-20T05: 00:00 AND 2022- 08-27T05 : 00: 00
WHERE vendor = "juniper" and model = "QSFP- abc"
GROUP BY system, ifc
```

260

| system | ifc  | vendor  | model    | temp |
|--------|------|---------|----------|------|
| SN-aaa | eth0 | Juniper | QSFP-abc | 67   |
| SN-aaa | eth1 | Juniper | QSFP-abc | 65   |
| SN-bbb | swp1 | Juniper | QSFP-abc | 69   |

Case 2: IBA xcvr inventory pie chart

SELECT vendor, model, COUNT (*) as count, temp_alarm_low, temp_alarm_high
 FROM probe.optical.stage-2min-avg
 GROUP BY vendor, model
 SORTED BY count

| vendor | model | count | temp_alarm_how | Temp_alarm_hight |
|---|---|---|---|---|
| Juniper | QSFP-111 | 20 | 50 | 60 |
| Juniper | QSFP-222 | 15 | 45 | 65 |

FIG. 7

Case 3: IBA xcvr Interquartile Range (IQR) analysis and box-whisker graph 3.1) If we add IQR processor in probe -view current IOR

```
SELECT vendor, model, temp.iqr25 as 25%, temp.iqr50 as 50%, temp.iqr75 as 75%,
temp.iqrMin as min, temp.iqrMax as max
    FROM probe.ibaunit.optical.iqr
    WHERE vendor = "juniper"
```
280

| vendor | model | 25 % | 50 % | 75 % | min | max |
|--------|-------|------|------|------|-----|-----|
| Juniper | QSFP-111 | 60 | 65 | 67 | 57 | 68 |
| Juniper | QSFP-222 | 59 | 66 | 69 | 50 | 71 |

```
SELECT vendor, simpleLinearRegression(temp_iqr.50%) as medianSLR
FROM (
    SELECT vendor, iqr(temp) as temp_iqr
    FROM metricdb.bp_id.optical.stage-2min-avg
    WHERE vendor = "juniper" or vendor = "arista"
    BETWEEN 2022-08-20T05:00:00 AND 2022-08-27T05:00:00
    GROUP BY vendor
)
GROUP BY vendor
SORT BY vendor DESCENDING
```
⎫
⎬ 290
⎭

| vendor | medianSLR | gradient | intercept | confidence_range |
|--------|-----------|----------|-----------|------------------|
| Juniper | 0.1 | 60 | 0.02 | 0.18 |
| Arista | -0.2 | 60 | -0.12 | 0.02 |

QUERY MECHANISM FOR A NETWORK MANAGEMENT SYSTEM

This application claims the benefit of U.S. Provisional Patent Application No. 63/477,712, filed 29 Dec. 2022, the entire contents of which is incorporated herein by reference.

TECHNICAL FIELD

The disclosure relates to computer networks, and more particularly, to management of network devices.

BACKGROUND

A computer network is a collection of interconnected computing devices that can exchange data and share resources. A variety of devices operate to facilitate communication between the computing devices. For example, a computer network may include routers, switches, gateways, firewalls, and a variety of other devices to provide and facilitate network communication.

These network devices typically include mechanisms, such as management interfaces, for locally or remotely configuring the devices. By interacting with the management interface, a client can perform configuration tasks as well as perform operational commands to collect and view operational data of the managed devices. For example, the clients may configure interface cards of the device, adjust parameters for supported network protocols, specify physical components within the device, modify routing information maintained by a router, access software modules and other resources residing on the device, and perform other configuration tasks. In addition, the clients may allow a user to view current operating parameters, system logs, information related to network connectivity, network activity or other status information from the devices as well as view and react to event information received from the devices.

Network configuration services may be performed by multiple distinct devices, such as routers with service cards and/or dedicated service devices. Such services include connectivity services such as Layer Three Virtual Private Network (L3VPN), Virtual Private Local Area Network Service (VPLS), and Peer to Peer (P2P) services. Other services include network configuration services, such as Dot1q VLAN Service. Network management systems (NMSs) and NMS devices, also referred to as controllers or controller devices, may support these services such that an administrator (e.g., a network administrator) can easily create and manage these high-level network configuration services.

SUMMARY

In general, this disclosure describes techniques for allowing a network administrator to query metrics (e.g., temperature, interface traffic, transceiver load, transceiver power, etc.) for network devices from multiple databases that may be geographically separated and filtering the results based on device properties (e.g. hardware model, operating system version, transceiver type) and context (e.g. a location of device in a datacenter topology or a device's role in routing). In some systems, the metrics are stored in a telemetry database that is separate from the database(s) of device properties and context. In an intent-based network management system (NMS), such as Juniper Apstra™, the context may be stored in an intent graph database. Therefore, in response to a query, there may be subqueries to many different databases.

Retrieving and compiling information from many different databases may complicate the response to the query. Such compilation may involve, at the client side, non-trivial processing such as table joins, sorting and filtering. The network administrator may be required to write additional bespoke code to perform the custom processing. Such an approach may also require a large amount of data to be transferred from multiple databases, which may result in sub-optimal use of computing power, memory and network bandwidth. For example, a network administrator may manually "stitch" data from different databases together to monitor a network. For instance, a network administrator at a client device (e.g., a laptop or computer) may generate 5-10 API calls to request data from different database to monitor a network. That is, the network administrator may manually retrieve and identify relevant data for monitoring a network. Alternatively, the network administrator may write bespoke code for each query to perform actions like filtering, sorting and data joins.

In accordance with the techniques of the disclosure, a system may be configured to provide a query mechanism at a cluster (e.g., containers implementing network monitoring services for a client) and/or at cloud-based services. A NMS may be configured to provide a query mechanism to provide "turn-key" solutions that automatically stitch data from different databases together and/or to generate a user interface that visualizes stitched data from different databases. In this way, the system may more quickly provide query results compared to systems relying on a network administrator to write additional bespoke code to perform the custom processing, which may reduce a time to diagnose and/or resolve networking issues in a network. In some examples, automatically stitching data from different databases together may reduce an amount of data to be transferred from multiple databases compared to systems relying on a network administrator to write additional bespoke code to perform the custom processing, which may result in a more optimal use of computing power, memory and/or network bandwidth. In some examples, the query mechanism may additionally, or alternatively, discover new patterns for improving a causality graph and/or a root cause analysis. In some examples, the query mechanism may additionally, or alternatively, discover new ways of performing intent-based analytics.

In one example, a system includes one or more processors configured to receive a query indicating one or more of filtering information, sorting information, or joining information, retrieve, from a first datastore, an intent graph for a network, wherein the intent graph comprises nodes representing components of the network and edges representing connections between the components, select a subset of a plurality of network devices of the network based on the query and the intent graph retrieved from the first datastore, retrieve, from a second datastore, data received from the plurality of network devices of the network, determine a response to the query based on the selected subset of the plurality of network devices and the data retrieved from the second datastore, and output the response to the query.

In another example, a method includes receiving a query indicating one or more of filtering information, sorting information, or joining information, retrieving, from a first datastore, an intent graph for a network, wherein the intent graph comprises nodes representing components of the network and edges representing connections between the components, selecting a subset of a plurality of network devices of the network based on the query and the intent graph retrieved from the first datastore, retrieving, from a second datastore, data received from the plurality of network devices of the network, determining a response to the query based on the selected subset of the plurality of network devices and the data retrieved from the second datastore, and outputting the response to the query.

In another example, a computer-readable storage medium is encoded with instructions for causing one or more programmable processors to receive a query indicating one or more of filtering information, sorting information, or joining information, retrieve, from a first datastore, an intent graph for a network, wherein the intent graph comprises nodes representing components of the network and edges representing connections between the components, select a subset of a plurality of network devices of the network based on the query and the intent graph retrieved from the first datastore, retrieve, from a second datastore, data received from the plurality of network devices of the network, determine a response to the query based on the selected subset of the plurality of network devices and the data retrieved from the second datastore, and output the response to the query.

The details of one or more examples are set forth in the accompanying drawings and the description below. Other features, objects, and advantages will be apparent from the description and drawings, and from the claims.

BRIEF DESCRIPTION OF DRAWINGS

FIG. 4 is example code illustrating a first example use case directed to generating a histogram according to techniques of this disclosure.

FIG. 5 is example code illustrating a second example use case directed to generating a histogram according to techniques of this disclosure.

FIG. 6 is example code illustrating a third example use case directed to generating a histogram according to techniques of this disclosure.

FIG. 7 is example code illustrating an example use case directed to generating a pie chart according to techniques of this disclosure.

FIG. 8 is example code illustrating an example with computations embedded in the query mechanism, such as an interquartile range (IQR) operation according to techniques of this disclosure.

FIG. 9 is example code illustrating an example query mechanism for linear regression according to techniques of this disclosure.

DETAILED DESCRIPTION

Figure 1:
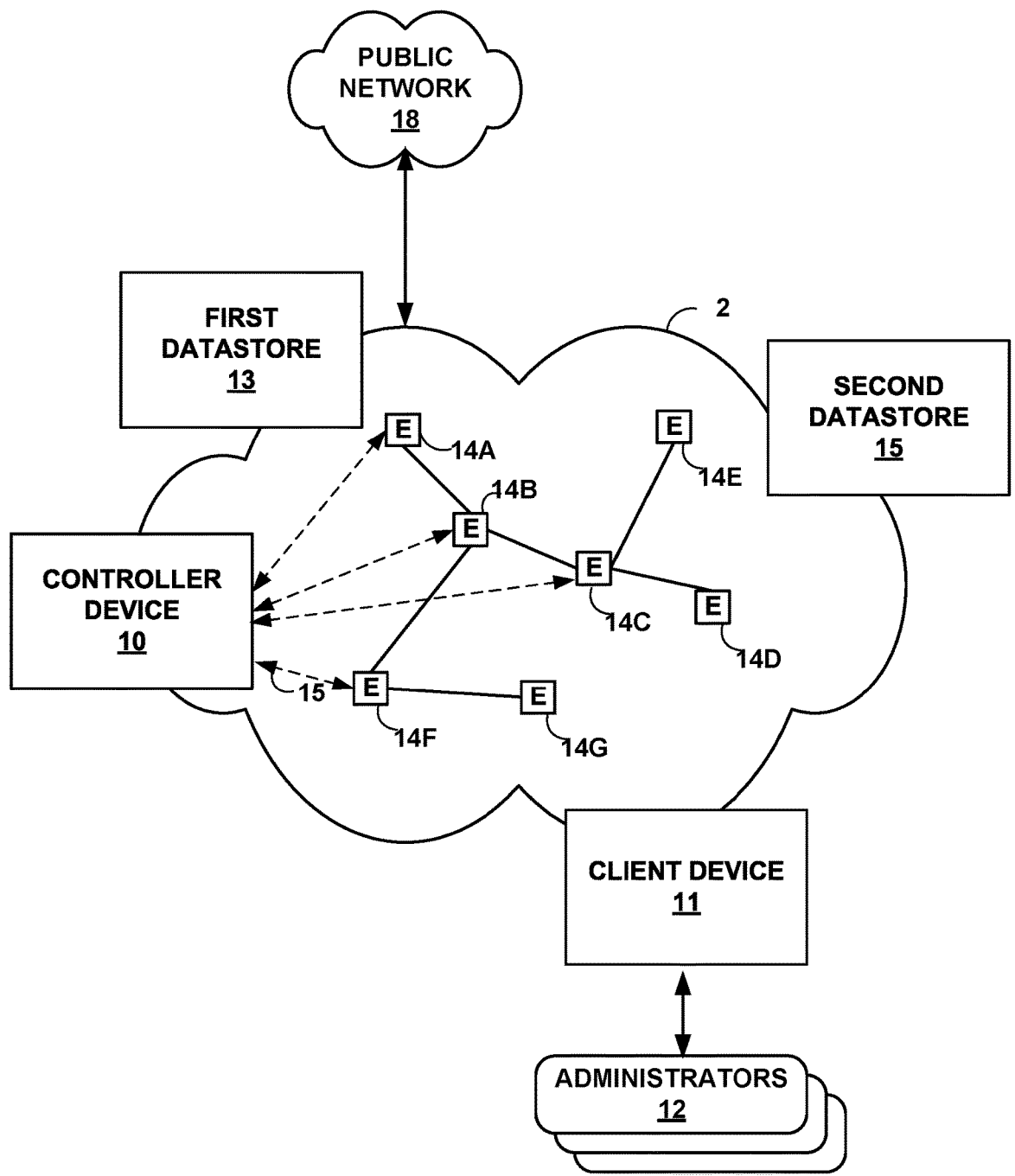
FIG. 1 is a block diagram illustrating an example including elements of an enterprise network that are managed using a management device.

FIG. 1 is a block diagram illustrating an example including elements of an enterprise network 2 that are managed using a controller device 10. Managed elements 14A-14G (collectively, "elements 14") of enterprise network 2 include network devices interconnected via communication links to form a communication topology in order to exchange resources and information. Elements 14 (also generally referred to as network devices or remote network devices) may include, for example, routers, switches, gateways, bridges, hubs, servers, firewalls or other intrusion detection systems (IDS) or intrusion prevention systems (IDP), computing devices, computing terminals, printers, other network devices, or a combination of such devices. While described in this disclosure as transmitting, conveying, or otherwise supporting packets, enterprise network 2 may transmit data according to any other discrete data unit defined by any other protocol, such as a cell defined by the Asynchronous Transfer Mode (ATM) protocol, or a datagram defined by the User Datagram Protocol (UDP). Communication links interconnecting elements 14 may be physical links (e.g., optical, copper, and the like), wireless, or any combination thereof.

Enterprise network 2 is shown coupled to public network 18 (e.g., the Internet) via a communication link. Public network 18 may include, for example, one or more client computing devices. Public network 18 may provide access to web servers, application servers, public databases, media servers, end-user devices, and other types of network resource devices and content.

Controller device 10 is communicatively coupled to elements 14 via enterprise network 2. Controller device 10 may comprise, for example, a cluster of virtual machines. Controller device 10, in some examples, forms part of a device management system, although only one device of the device management system is illustrated for purpose of example in FIG. 1. Controller device 10 may be coupled either directly or indirectly to the various elements 14. Once elements 14 are deployed and activated, administrator 12, via client device 11 (e.g., a mobile device, laptop, computer, server, etc.), uses controller device 10 to manage the network devices using a device management protocol. One example device protocol is the Simple Network Management Protocol (SNMP) that allows controller device 10 to traverse and modify management information bases (MIBs) that store configuration data within each of managed elements 14. Further details of the SNMP protocol can be found in Harrington et al., RFC 3411, "An Architecture for Describing Simple Network Management Protocol (SNMP) Management Frameworks," Network Working Group, the Internet Engineering Task Force draft, December 2002, available at http://tools.ietf.org/html/rfc3411, the entire contents of which are incorporated herein by reference.

Controller device 10, also referred to herein as a network management system (NMS) or NMS device, and elements 14 are centrally maintained by an IT group of the enterprise. Administrator 12 interacts with controller device 10 to remotely monitor and configure elements 14. For example, administrator 12 may receive alerts from controller device 10 regarding any of elements 14, view configuration data of elements 14, modify the configurations data of elements 14, add new network devices to enterprise network 2, remove existing network devices from enterprise network 2, or otherwise manipulate the enterprise network 2 and network devices therein. Although described with respect to an enterprise network, the techniques of this disclosure are applicable to other network types, public and private, including LANs, VLANs, VPNs, and the like.

In some examples, administrator 12 uses controller device 10 or a local workstation to interact directly with elements 14, e.g., through telnet, secure shell (SSH), or other such communication sessions. That is, elements 14 generally provide interfaces for direct interaction, such as command line interfaces (CLIs), web-based interfaces, graphical user interfaces (GUIs), or the like, by which a user can interact with the devices to directly issue text-based commands. For example, these interfaces typically allow a user to interact directly with the device, e.g., through a telnet, secure shell (SSH), hypertext transfer protocol (HTTP), or other network session, to enter text in accordance with a defined syntax to submit commands to the managed element. In some examples, the user initiates an SSH session 15 with one of elements 14, e.g., element 14F, using controller device 10, to directly configure element 14F. In this manner, a user can provide commands in a format for execution directly to elements 14.

Further, administrator 12 can also create scripts with client device 11 that can be submitted by controller device 10 to any or all of elements 14. For example, in addition to a CLI interface, elements 14 also provide interfaces for receiving scripts that specify the commands in accordance with a scripting language. In a sense, the scripts may be output to controller device 10 to automatically invoke corresponding remote procedure calls (RPCs) on the managed elements 14. The scripts may conform to, e.g., extensible markup language (XML) or another data description language.

Administrator 12 uses controller device 10 and client device 11 to configure elements 14 to specify certain operational characteristics that further the objectives of administrator 12. For example, administrator 12 may specify for an element 14 a particular operational policy regarding security, device accessibility, traffic engineering, quality of service (QOS), network address translation (NAT), packet filtering, packet forwarding, rate limiting, or other policies. Controller device 10 uses one or more network management protocols designed for management of configuration data within managed network elements 14, such as the SNMP protocol or the Network Configuration Protocol (NETCONF) protocol or a derivative thereof, such as the Juniper Device Management Interface, to perform the configuration. In general, NETCONF provides mechanisms for configuring network devices and uses an Extensible Markup Language (XML)-based data encoding for configuration data, which may include policy data. NETCONF is described in Enns, "NETCONF Configuration Protocol," Network Working Group, RFC 4741, December 2006, available at tools.ietf.org/html/rfc4741, the entire contents of which are incorporated herein by reference. Controller device 10 may establish NETCONF sessions with one or more of elements 14.

A user configuration of devices may be referred to as "intents." An intent-based networking system may help to allow administrators 12 to describe the intended network/compute/storage state. User intents can be categorized as business policies or stateless intents. Business policies, or stateful intents, may be resolved based on the current state of a network. Stateless intents may be fully declarative ways of describing an intended network/compute/storage state, without concern for a current network state.

Intents may be represented as intent data models, which may be modeled using unified graphs. Intent data models may be represented as connected graphs, such that business policies can be implemented across intent data models. For example, data models may be represented using connected graphs having vertices connected with has-edges and reference (ref) edges. Controller devices may model intent data models as unified graphs, so that the intend models can be represented as connected. In this manner, business policies can be implemented across intent data models. When intents are modeled using a unified graph model, extending new intent support needs to extend the graph model and compilation logic.

Controller device 10 may be configured to accept high-level configuration data, or intents, from administrator 12 (which may be expressed as structured input parameters, e.g., according to YANG, which is described in Bjorklund, "YANG-A Data Modeling Language for the Network Configuration Protocol (NETCONF)," Internet Engineering Task Force, RFC 6020, October 2010, available at tools.ietf.org/html/rfc6020).

In order to configure devices to perform the intents, a user (such as an administrator 12) may write translation programs that translate high-level configuration instructions (e.g., instructions according to an intent data model, which may be expressed as a unified graph model) to low-level configuration instructions (e.g., instructions according to a device configuration model). As part of configuration service support, administrator 12 may provide the intent data model and a mapping between the intent data model to a device configuration model.

Controller device 10 may also be configured to output respective sets of low-level device configuration data, e.g., device configuration additions, modifications, and removals. Additional details regarding an example process for translating high level configuration information to low-level device configuration information can be found in, e.g., Jiang et al., "TRANSLATING HIGH-LEVEL CONFIGURATION INSTRUCTIONS TO LOW-LEVEL DEVICE CONFIGURATION," U.S. patent application Ser. No. 15/198,657, filed Jun. 30, 2016, the entire contents of which are hereby incorporated by reference. This disclosure refers to low-level device configuration produced from intents (e.g., produced by compiling or translating the intents) as "device-level intent configuration information" or "intent configuration," to distinguish this device-level configuration from out of band (OOB) device-level configuration. In some examples, controller device 10 may use YANG modeling for an intent data model and low-level device configuration models. This data may contain relations across YANG entities, such as list items and containers. In some examples, controller device 10 may convert a YANG data model into a database model, and convert YANG validations into data validations. Techniques for managing network devices using a graph model for high level configuration data is described in "CONFIGURING AND MANAGING NETWORK DEVICES USING PROGRAM OVERLAY ON YANG-BASED GRAPH DATABASE," U.S. patent application Ser. No. 15/462,465, filed Mar. 17, 2017, the entire contents of which are hereby incorporated by reference.

Controller device 10 may receive data from one of administrators 12 representing any or all of create, update, and/or delete actions with respect to the intent data model. Controller device 10 may be configured to use the same compilation logic for each of create, update, and delete as applied to the graph model.

In general, controllers like controller device 10 may use a hierarchical data model for intents, low-level data models, and resources. The hierarchical data model can be based on YANG or YAML. The hierarchical data model can be represented as a graph, as discussed above. Use of intents may ease the management of networks and intents are declarative. To realize intents, controller device 10 may attempt to select optimal resources from elements 14 and/or from other devices.

In general, controller device 10 may be configured to translate a high-level configuration (e.g., intents received from an administrator for a plurality of managed network devices) to low-level configuration, which may also be referred to herein as "device-level configuration" (to be applied to the managed network devices themselves). In some instances, controller device 10 may receive an indication of a topology and a role for element 14A and generate device-level configuration information for element 14A. For example, administrator 12 may select a topology and role for element 14A and provide an intent. In some examples, controller device 10 may generate device-level configuration for element 14A based on the role (e.g., spine or leaf) of element 14A in the topology (e.g., a spine and leaf topology), the topology, and the intent.

In accordance with the techniques of the disclosure, controller device 10 may be configured to receive a query indicating one or more of filtering information, sorting information, or joining information. For example, controller device 10 may receive an API request from client device 11. The filtering information may include, for example, one or more of a vendor, model, an interface, a system, or a time range. The joining information may include, for example, grouping by model, grouping by system, grouping by vendor, grouping by interface. The sorting information may include, for example, sorting by vendor, or sorting by count.

Controller device 10 may retrieve, from first datastore 13, an intent graph for a network. The intent graph may include nodes representing components of the network and edges representing connections between the components. Controller device 10 may select a subset of a network devices 14 based on the query and an intent graph retrieved from first datastore 13. For example, controller device 10 may select network devices 14A, 14B in response to determining that the intent graph indicates network devices 14A, 14B support a networking service indicated by the query. Examples of first datastore 13 may include an intent graph database or a graph index database.

Controller device 10 may retrieve, from second datastore 15, data received from the plurality of network devices of the network. Controller device 10 may determine a response to the query based on the selected subset of the plurality of network devices and the data retrieved from second datastore 15. Examples of second datastore 15 may include one or more of a root cause identification (RCI) database, a computed telemetry database, a raw telemetry database, an intent-based analytics probe stage output database, an intent-based probe anomalies database, or a device-level anomaly database. In some examples, second datastore 15 may additionally, or alternatively, include one or more of a cluster health telemetry database, an audit event log database, a blueprint API, or a mutation API database. For example, controller device 10 may access one or more databases to retrieve computed and/or raw telemetry for network devices 14A, 14B.

Controller device 10 may output the response to the query. For example, controller device 10 may output a histogram indicating the computed and/or raw telemetry for network devices 14A, 14B to client device 11. Controller device 10 may be implemented by a system (e.g., a network management system) providing a query mechanism at a cluster (e.g., containers implementing network monitoring services for a client) and/or at cloud-based services. In this way, controller device 10 and/or the network management system may be configured to provide "turn-key" solutions that automatically stiches data from different databases together and/or generates a user interface that visualizes stitched data from different databases. In some examples, controller device 10 and/or the network management system may be configured to discover new patterns for improving a causality graph and/or a root cause analysis. Controller device 10 and/or the network management system may be configured to discover new ways of performing intent-based analytics.

Figure 2:
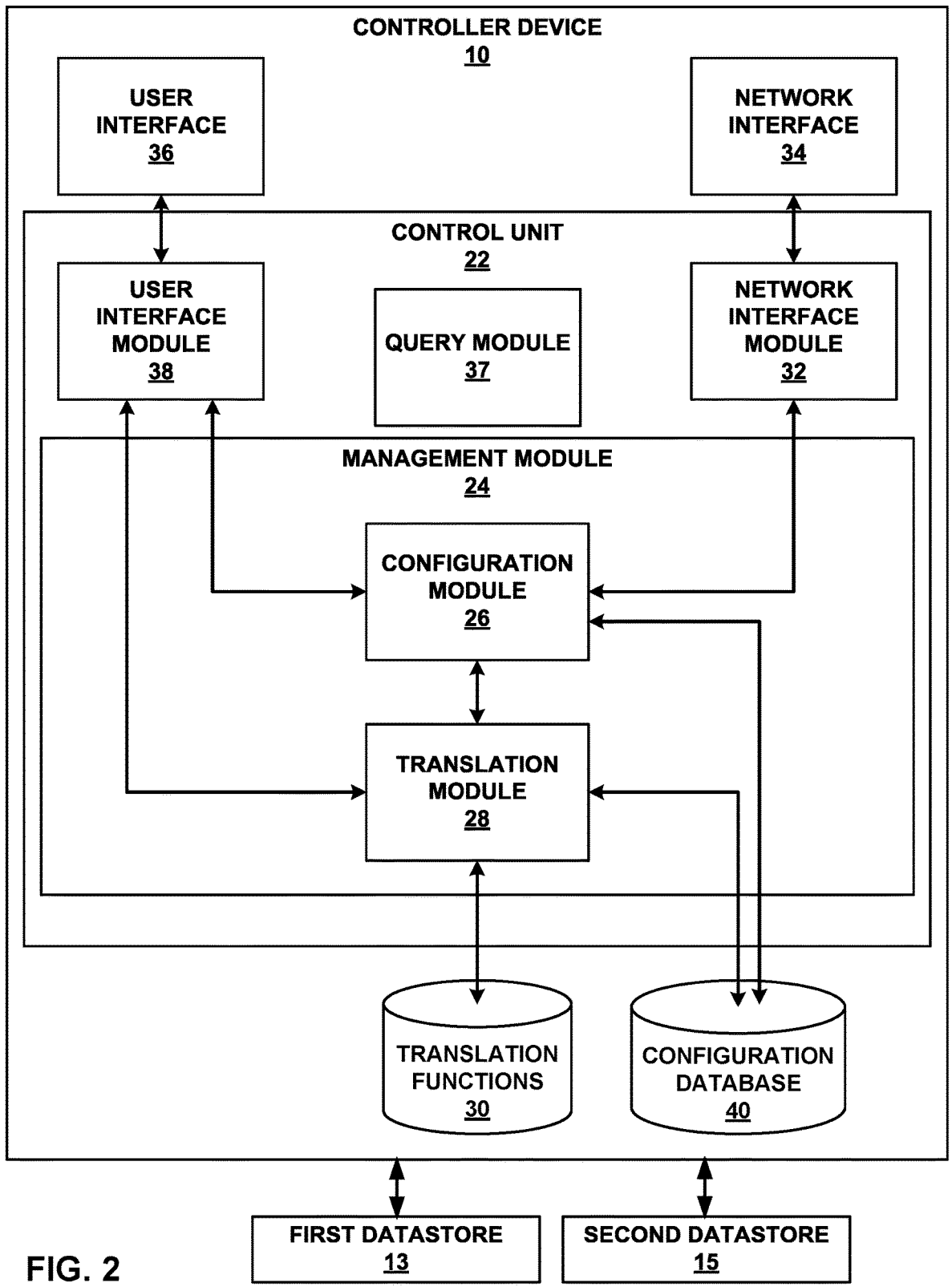
FIG. 2 is a block diagram illustrating an example set of components for the management device of FIG. 1.

FIG. 2 is a block diagram illustrating an example set of components for controller device 10 of FIG. 1. In this example, controller device 10 includes control unit 22, network interface 34, and user interface 36. Network interface 34 represents an example interface that can communicatively couple controller device 10 to an external device, e.g., one of elements 14 of FIG. 1. Network interface 34 may represent a wireless and/or wired interface, e.g., an Ethernet interface or a wireless radio configured to communicate according to a wireless standard, such as one or more of the IEEE 802.11 wireless networking protocols (such as 802.11 a/b/g/n or other such wireless protocols). Controller device 10 may include multiple network interfaces in various examples, although only one network interface is illustrated for purposes of example.

Control unit 22 represents any combination of hardware, software, and/or firmware for implementing the functionality attributed to control unit 22 and its constituent modules and elements. When control unit 22 includes software or firmware, control unit 22 further includes any necessary hardware for storing and executing the software or firmware, such as one or more processors or processing units. In general, a processing unit may include one or more microprocessors, digital signal processors (DSPs), application specific integrated circuits (ASICs), field programmable gate arrays (FPGAs), or any other equivalent integrated or discrete logic circuitry, as well as any combinations of such components. Furthermore, a processing unit is generally implemented using fixed and/or programmable logic circuitry.

User interface 36 represents one or more interfaces by which a user, such as administrator 12 (FIG. 1) interacts with controller device 10, e.g., to provide input and receive output. For example, user interface 36 may represent one or more of a monitor, keyboard, mouse, touchscreen, touchpad, trackpad, speakers, camera, microphone, or the like. Furthermore, although in this example controller device 10 includes a user interface, it should be understood that administrator 12 need not directly interact with controller device 10, but instead may access controller device 10 remotely, e.g., via network interface 34.

In this example, control unit 22 includes user interface module 38, network interface module 32, and management module 24. Control unit 22 executes user interface module 38 to receive input from and/or provide output to user interface 36. Control unit 22 also executes network interface module 32 to send and receive data (e.g., packets) via network interface 34. User interface module 38, network interface module 32, and management module 24 may again be implemented as respective hardware units, or in software or firmware, or a combination thereof.

Control unit 22 executes management module 24 to manage various network devices, e.g., elements 14 of FIG. 1. Management includes, for example, configuring the network devices according to instructions received from a user (e.g., administrator 12 of FIG. 1) and providing the user with the ability to submit instructions to configure the network devices. In this example, management module 24 further includes configuration module 26 and translation module 28.

Management module 24 is configured to receive an intent (e.g., a high-level configuration instruction) for a set of managed network devices from a user, such as administrator 12. In some examples, management module 24 may be referred to herein as a "fabric manager." Over time, the user may update the configuration instructions, e.g., to add new services, remove existing services, or modify existing services performed by the managed devices. The intents may be structured according to, e.g., YANG. In some examples, management module 24 also provides the user with the ability to submit translation functions that translation module 28 executes to transform intents to device-specific, low-level configuration instructions, as discussed below.

Controller device 10 also includes configuration database 40. Configuration database 40 may include a data structure describing managed network devices, e.g., network elements 14. Configuration database 40 may act as an intent data store, which may be used to persist and manage collections of intent data models. For example, configuration database 40 may include information indicating device identifiers (such as MAC and/or IP addresses), device type, device vendor, or devices species (e.g., router, switch, bridge, hub, etc.) Configuration database 40 may store current configuration information (e.g., intent data model, or in some cases, both intent data model and low-level configuration information) for the managed devices (e.g., network elements 14). Configuration database 40 may include a database that comprises a unified intent data model.

Management module 24 may maintain one or more data structures for device configurations derived from stateful intent. For example, management module 24 may maintain a data structure in configuration database 40. The data structure may include a plurality of vertices and a plurality of edges, each vertex of the plurality of vertices representing a respective network device of a plurality of network devices (e.g., network elements 14) or a respective intent of a plurality of stateless intents, and the plurality of edges defining relationships between the plurality of vertices. Management module 24 may receive an indication of a stateful intent. For example, management module 24 may receive intent unified-graph-modeled configuration data for a set of managed network devices from a user, such as administrator 12.

Translation module 28, which may also be referred to herein as a "device manager," may determine which devices are managed using configuration database 40. Translation module 28 determines which of translation functions 30 to execute on the high-level configuration instructions based on the information of configuration database 40, e.g., which of the devices are to receive the low-level configuration instructions. Translation module 28 then executes each of the determined translation functions of translation functions 30, providing the high-level configuration instructions to the translation functions as input and receiving low-level configuration instructions. Translation module 28 may then provide the low-level configuration instructions to configuration module 26.

After receiving the low-level configuration instructions (e.g., device-level configuration instructions) from translation module 28, configuration module 26 may send the low-level configuration instructions to respective managed network devices for which configuration is to be updated via network interface module 32. Network interface module 32 passes the low-level configuration instructions to network interface 34. Network interface 34 forwards the low-level configuration instructions to the respective network devices.

Although user interface 36 is described for purposes of example of allowing administrator 12 (FIG. 1) to interact with controller device 10, other interfaces may be used in other examples. For example, controller device 10 may include a representational state transfer (REST) client (not shown) that may act as an interface to another device, by which administrator 12 may configure controller device 10. Likewise, administrator 12 may configure elements 14 by interacting with controller device 10 through the REST client.

In accordance with the techniques of the disclosure, query module 37 may be configured to receive a query indicating one or more of filtering information, sorting information, or joining information. For example, network interface 34 may receive an API request from client device 11. Query module 37 may retrieve, from first datastore 13, an intent graph for a network. The intent graph may include nodes representing components of the network and edges representing connections between the components.

Query module 37 may select a subset of a network devices 14 based on the query and the intent graph retrieved from first datastore 13. For instance, query module 37 may select a subset network devices in response to determining that the intent graph indicates that the subset network devices support a networking service indicated by the query.

Query module 37 may retrieve, from second datastore 15, data received from the plurality of network devices of the network. Query module 37 may determine a response to the query based on the selected subset of the plurality of network devices and the data retrieved from second datastore 15. For example, query module 37 may access one or more databases to retrieve computed and/or raw telemetry for network devices 14A, 14B. Controller device 10 may output an indication of the response to the query. For example, query module 37, with network interface 34, may output a histogram indicating the computed and/or raw telemetry for network devices 14A, 14B to client device 11. While illustrated as a single device, controller device 10 may be implemented by a system (e.g., a network management system) providing a query mechanism at a cluster (e.g., containers implementing network monitoring services for a client) and/or at cloud-based services. In this way, controller device 10 and/or the network management system may be configured to provide "turn-key" solutions that automatically stiches data from different databases together and/or generates a user interface that visualizes stitched data from different databases. In some examples, controller device 10 and/or the network management system may be configured to discover new patterns for improving a causality graph and/or a root cause analysis. Controller device 10 and/or the network management system may be configured to discover new ways of performing intent-based analytics.

Figure 3:
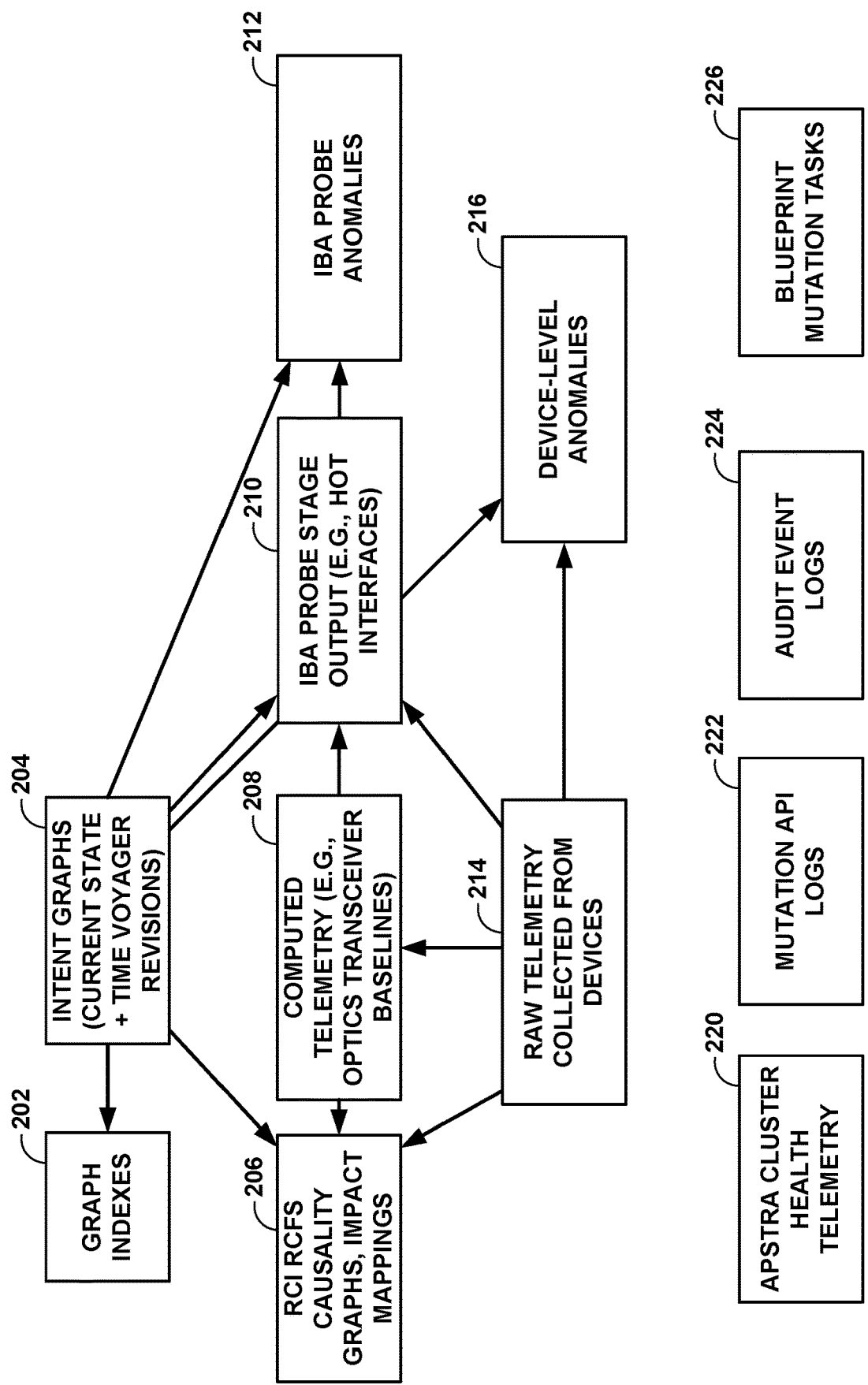
FIG. 3 is a conceptual diagram illustrating example databases in accordance with the techniques of this disclosure.

FIG. 3 is a conceptual diagram illustrating example databases in accordance with the techniques of this disclosure. For example, controller device 10 or a network management system may be configured to access the various databases and logs shown in FIG. 3.

In the example of FIG. 3, controller device 10 may access databases related to graph models for the network. For instance, controller device 10 may access an intent graph database 204 that is configured to store a current state of an intent graph model and one or more previous versions of the intent graph model. Controller device 10 may access a graph index database 202 that includes an indexed data mapped to respective intent graphs stored in the intent graph database. In some examples, controller device 10 may be configured to access a root cause identification (RCI) database 206 that may store root cause fault (RCF) for identifying a network fault, a causality graph for determining a cause for the network fault, and/or impact mappings that identify impacted network devices and/or services for a network fault. Controller device 10 may access a computed telemetry database 208 (e.g., for optical transceiver baseline values) and/or a raw telemetry database 214. In some examples, controller device 10 may access an intent-based analytics probe stage output database 210 (e.g., that identifies hot interfaces across a network), intent-based probe anomalies 212, and/or a device-level anomaly database 216.

Further, controller device 10 may access databases that store logs. For example, controller device 10 may access an Apstra cluster health telemetry database 220 storing health information relating to host containers implementing controller device 10. For instance, the Apstra cluster health telemetry database 220 may store a CPU utilization, memory utilization, filesystem utilization, when a process is restarted, and/or when containers are restarted. Controller device 10 may access an audit event log database 224 storing, for example, when a user logs in or logs out, when a user deletes or creates an intent graph model (e.g., a blueprint), deploy changes to device configurations, and/or a failed login. Controller device 10 may access a blueprint API mutation tasks database 226 that stores information for requests to change the intent graph model and/or a mutation API logs database 222 that stores information about changes to resource pools and/or changes to clusters, add and/or remove operation of design catalog elements, and/or update password operations.

Data stored by the various databases of FIG. 3 may not be well formed. For example, consider a query for optical transceiver operational temperature thresholds for spines in a datacenter. In this example, controller device 10 may first determine the device serial numbers assigned to spines from an intent graph model of intent graph database 204. Suppose there are 3 spines with serial numbers sn1, sn2 and sn3. Controller device 10 may then use the serial numbers as an index into computed telemetry database 208 to obtain the optical transceiver temperature thresholds, which may be stored on a per-device basis. However, computed telemetry database 208 may not have data for sn3. In this example, the intent graph model of intent graph database 204 may report that the spine device with serial number sn3 is present in the network for the time period being queried but computed telemetry database 208 may report that there are no optical transceiver temperature threshold data for sn3 for that same time period. As such, controller device 10 may automatically "stitch" data from intent graph database 204 and computed telemetry database 208 to determine that sn1 and sn2 are present in the network and optical transceiver telemetry is collected and computed properly, whereas the telemetry data for sn3 is not yet available in computed telemetry database 208, perhaps due to a telemetry collection failure, an absence of optical transceivers on that device, a communication issue with the device, etc.

FIG. 4 is example code 240 illustrating a first example use case directed to generating a histogram according to techniques of this disclosure. In this example, network administrator 12 may use code 240 to identify a table that shows for each system and interface name ("ifc") combination a respective temperature. Administrator 12 identifies with code 240 an IBA probe "probe.ibaunit.optical," and a stage "stage-2 min-avg" that outputs a two minute temperate average. Administrator 12 may filter the results to a vendor "juniper" and interfaces with transceiver model "QSFP-abc."

In this example, controller device 10 or a NMS (e.g., cluster or cloud-based services) may access intent graph database 204 to identify serial numbers for network devices with the vendor "juniper" and interfaces with transceiver model "QSFP-abc." In this way, controller device 10 or the NMS may select a subset of network devices and a subset of interfaces per device in the network based on filtering information (e.g., network devices with the vendor "juniper" and transceiver model "QSFP-abc"). In this example, controller device 10 or the NMS may access IBA probe stage output database 210 to determine the temperatures for the identified interfaces in network devices with the identified serial numbers. For instance, controller device 10 or the NMS may determine a response to the query 242 based on the selected subset of network devices (e.g., as identified by serial numbers) and a selected subset of interfaces per device (e.g., as identified by transceiver model), and data stored in IBA probe stage output database 210. In the example of FIG. 4, controller device 10 or the NMS may apply one or more functions (e.g., an average function or more specifically a 2 minute average function) to the data retrieved from the second datastore to generate the response to the query.

The query mechanism example of FIG. 4, may reduce a number of steps performed by client device 11 (e.g., a laptop or computer used by the network administrator) from 4 to 1 (e.g., a single application programming interface request). For instance, without the query mechanism, administrator 12 would make 1 API call to intent graph database 204 to identify serial numbers for devices of vendor "juniper," and each such network device's interfaces with transceiver model "QSFP-abc", 1 API call to the IBA probe stage output database 210 to determine the temperature for those interfaces, manually filter interfaces that do not have a transceiver of model "QSFP-abc", and finally join all the above data into a single table.

FIG. 5 is example code 250 illustrating a second example use case directed to generating a histogram according to techniques of this disclosure. In this example, administrator 12 may provide code 250 to cause controller device 10 or the NMS to create a table 252 that shows for each transceiver model, on each system (device serial number) the 2-minute-average temperature of interfaces that have that transceiver model. Administrator 12 may provide code 250 to cause controller device 10 or the NMS to identify an IBA probe "probe.ibaunit.optical," and a stage "stage-2 min-avg" that outputs a two minute temperate average of interface transceivers. Administrator 12 may provide code 250 to cause controller device 10 or the NMS to filter the results to a vendor "juniper" and a temperatures below 64 degrees and above 68 degrees ("temp<64 or temp>68"). Administrator 12 provide code 250 to cause controller device 10 or the NMS to group the rows by transceiver model, and sorts the groups in ascending order of transceiver model.

In this example, controller device 10 or the NMS may access intent graph database 204 to identify serial numbers for devices with the vendor "juniper". In this example, controller device 10 or NMS may access IBA probe stage output database 210 to determine the temperatures for interfaces of the identified serial numbers and filter out temperatures between 64 degrees and 68 degrees. In this example, controller device 10 or the NMS may generate table 252 to group by model.

FIG. 6 is example code illustrating a third example use case directed to generating a histogram according to techniques of this disclosure. In this example, controller device 10 or the NMS may identify a table 262 that shows for each system, interface name ("ifc"), and model combination a respective temperature. Administrator 12 may use code 260 to cause controller device 10 or the NMS to identify an IBA probe "metricdb.bp_id.optical," and a stage "stage-2 min-avg" that outputs a two minute temperate average for interface transceivers. Administrator 12 may use code 260 to cause controller device 10 or the NMS to filter the results to a time range ("BETWEEN 2022-08-20T05:00:00 and 2022-08-27T05:00:00"). Administrator 12 may further use code 260 to cause controller device 10 or the NMS filter to the results to a vendor "juniper" and a model ("QSFP-abc"). Administrator 12 may use code 260 to cause controller device 10 or the NMS filter to identify a group by model function "GROUP BY system, ifc."

In this example, controller device 10 or the NMS may access intent graph database 204 to identify serial numbers for devices with the vendor "juniper," the interfaces with transceiver model "QSFP-abc." In this example, controller device 10 or the NMS may access IBA probe stage output database 210 to determine the average of the two-minute average temperatures for the identified interfaces for the time range 2022-08-20T05:00:00-2022-08-27T05:00:00. In this example, controller device 10 or the NMS may generate the table 262 to group by system and ifc.

FIG. 7 is example code illustrating an example use case directed to generating a pie chart according to techniques of this disclosure. While the examples of FIGS. 4-6 were directed to a histogram, the techniques for the query mechanism may be directed to other data formats, such as, for example, a pie chart as shown in FIG. 7 or scatter plot. In this example, administrator 12 may provide code 270 indicating a vendor, model, count, low temperature alarm, and high temperature alarm and controller device 10 or the NMS may generate table 272.

FIG. 8 is example code illustrating an example with computations embedded in the query mechanism, such as an interquartile range (IQR) operation according to techniques of this disclosure. In this example, administrator 12 may provide code 280 to cause controller device 10 or the NMS to identify a table 282 that shows for each transceiver vendor and model combination a respective 25 percentile temperature, 50 percentile temperature (e.g., a median temperature), 75 percentile temperature, a min, and max temperature. Administrator 12 may provide code 280 to identify an IBA probe "probe.ibaunit.optical.iqr" that outputs the interquartile ranges of the two-minute avg temperature values.

In this example, controller device 10 or the NMS may access intent graph database 204 to identify interfaces and the network devices on which they are hosted. In this example, controller device 10 or the NMS may access IBA probe stage output database 210 to determine the temperatures. In this example, controller device 10 or the NMS may calculate the IQR outputs (e.g., percentile values) to generate table 282. In this example, by consulting the results of the query, administrator 12 may set a temperature range of 60 degrees to 67 degrees (e.g., 25th percentile to 75 percentile) as the acceptable operating range for interfaces with the vendor "Juniper" and model "QSFP-111." In the example of FIG. 8, controller device 10 or the NMS may apply one or more functions (e.g., an interquartile range function) to the data retrieved from the second datastore to generate the response to the query.

FIG. 9 is example code 290 illustrating an example query mechanism for linear regression according to techniques of this disclosure. Code 290, when executed by controller device 10 or the NMS, may perform a multi-step computation on temperatures for transceivers produced by "Juniper" or "Arista".

The example query of FIG. 9 may estimate the trend of temperatures—e.g. how average temperature varies across time—for transceivers produced by different vendors (Juniper and Arista). The estimate of FIG. 9 is a linear line defined by the gradient and y-intercept. The y-values are average temperatures and x-values are timestamps. To derive this estimate, controller device 10 or the NMS may perform a number of steps using the query.

First, controller device 10 or the NMS may access raw device telemetry database 214 to determine the two-minute average temperatures of every interface for the time range 2022-08-20T05:00:00 AND 2022-08-27T05:00:00. This produces a K time series, where K is the number of interfaces. Each time series may include N samples. Suppose the IBA probe is configured to compute a new average value for a transceiver every minute. In this example, there are 2 days (i.e. 2880 minutes) in the query time period. Thus N=2880.

Second, controller device 10 or the NMS may iterate over each element across the multiple time series, grouped by vendor. Suppose out of the K time series, J of them are for interfaces whose transceivers are produced by Juniper. Controller device 10 or the NMS may take the 1st sample from all J time series and compute the IQR among those J samples. The 50th percentile value of the IQR is the 1st sample of the output series. Controller device 10 or the NMS may take the 2nd sample from each of the J time series, compute IQR, and take the 50th percentile value as the 2nd sample in the output series, and so on, until all 2880 samples are processed. The result is an output series of 2880 samples for Juniper™ transceivers. Controller device 10 or the NMS may repeat the same process for the remaining K-J times series from step 1, which are for interfaces with Arista™ transceivers. In this way, controller device 10 or the NMS may produce a 2nd output time series with 2880 samples.

Third, controller device 10 or the NMS may take the 2 time series from the previous step. For each time series, controller device 10 or the NMS may perform linear regression on the 2880 samples. The output of the linear regression is the gradient, intercept and confidence intervals. Therefore, controller device 10 or the NMS may generate table 292 to include 2 rows—1 per time series (e.g., corresponding to transceiver vendors Juniper and Arista, respectively).

In this way, controller device 10 may provide functionality enabling a network administrator to run multi-step queries that are performed automatically to stitch together data from different databases using the cluster or cloud-based services. For example, the network administrator may perform the query operations shown in FIGS. 4-9 using simple functions. Moreover, controller device 10 may present a user interface that displays the relevant metrics derived from the stitched data and/or the raw stitched data itself to the administrator. In this way, controller device 10 may enable an administrator to review metrics that are from different databases, which may help to reduce an amount of time that the network administrator reviews metrics in response to a network event.

Figure 10:
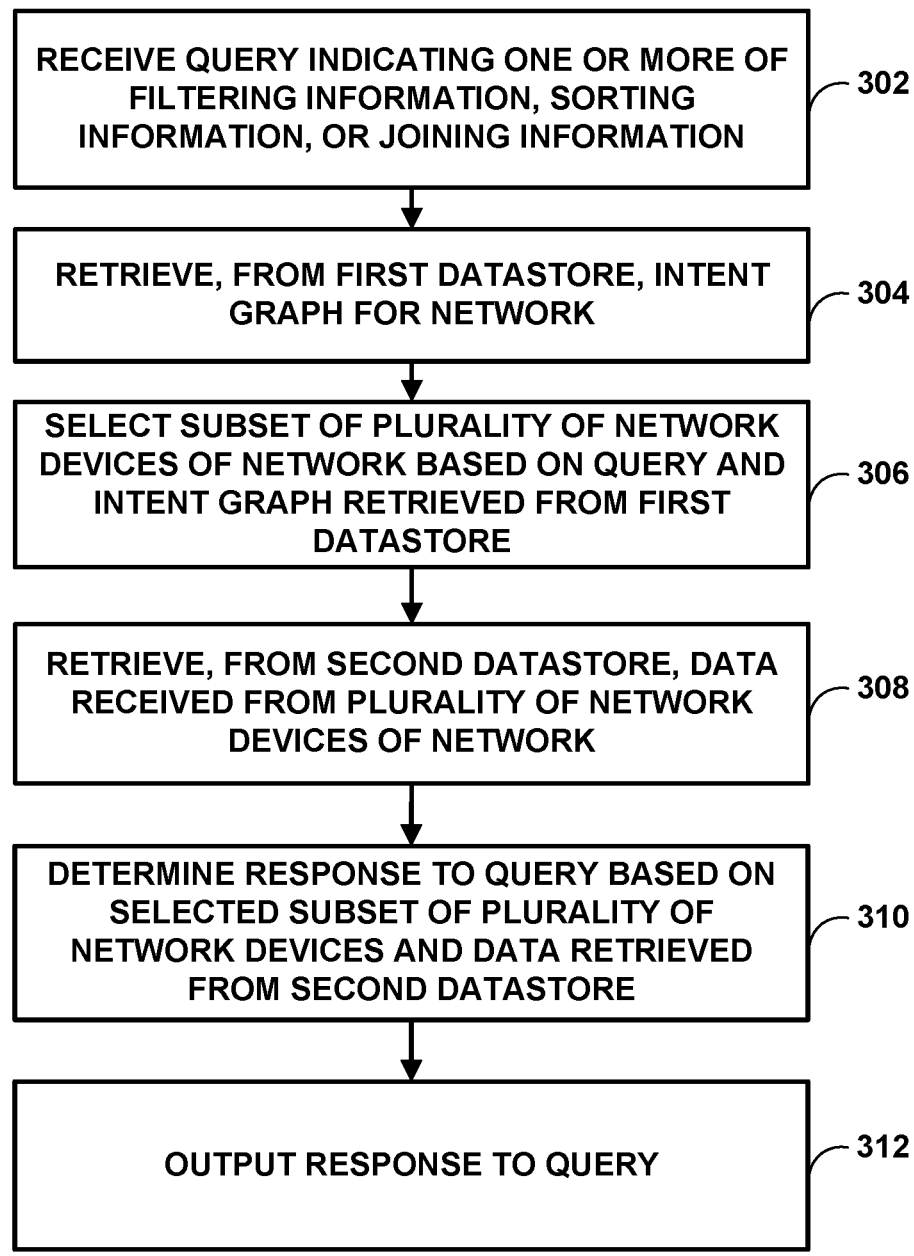
FIG. 10 is a flowchart illustrating an example process for a query mechanism to access multiple databases according to techniques of this disclosure.

FIG. 10 is a flowchart illustrating an example process for a query mechanism to access multiple databases according to techniques of this disclosure. A network management system or another system may include a first datastore 13 (e.g., intent graph database 204) storing an indication of an intent graph for a network. The intent graph may include nodes representing components of the network and edges representing connections between the components. First datastore 13 may include an intent graph database or a graph index database.

The network management system or another system may include second datastore 15 (e.g., one or more of databases 206-226) storing data received from a set of network devices of the network (304). The second datastore 15 may include one or more of a root cause identification (RCI) database, a computed telemetry database, a raw telemetry database, an intent-based analytics probe stage output database, an intent-based probe anomalies database, or a device-level anomaly database. In some examples, second datastore 15 may additionally, or alternatively include one or more of a cluster health telemetry database, an audit event log database, a blueprint application programming interface (API), or a mutation API database.

Controller device 10 (or the network management system) may receive a query indicating one or more of filtering information, sorting information, or joining information (302). The filtering information may include one or more of a vendor, model, an interface, a system, or a time range. For example, client device 11 may be configured to output the query based on a user input (e.g. of administrator 12). Controller device 10 may receive the query from client device 11 as a single application programming interface (API) request.

Controller device 10 may retrieve, from first datastore 13, an intent graph for a network (304). For example, controller device 10 may output a request for the intent graph from first datastore 13 before receiving the query or in response to receiving the query.

Controller device 10 (or the network management system) may select a subset of a plurality of network devices of the network based on the query and the intent graph retrieved from first datastore 13 (306). For example, controller device 10 may select network devices 14A, 14B in response to determining that the intent graph indicates network devices 14A, 14B support a networking service indicated by the query.

Controller device 10 may retrieve, from second datastore 15, data received from the plurality of network devices of the network (308). For example, controller device 10 may access or request data from one or more of databases 206-226 and/or other databases.

Controller device 10 (or the network management system) may determine a response to the query based on the selected subset of the plurality of network devices and the data retrieved from the second datastore 15 (310). For example, controller device 10 may convert the data retrieved from the second datastore 15 from a format of the second datastore 15 to a format specified in the query. For instance, when the format specified in the query includes a histogram format, controller device 10 may convert the data retrieved from the second datastore 15 from the format of the second datastore 15 to the histogram format. In some examples, controller device 10 may convert the data retrieved from second datastore 15 from a first unit of temperature (e.g., Celsius scale or Fahrenheit scale) to a second unit of temperature (e.g., Fahrenheit scale or Celsius scale). In some examples, controller device 10 may apply one or more functions to the retrieved from second datastore 15 to generate the response to the query. The one or more functions may include one or more of an average function, an interquartile range function, or a linear regression function.

Controller device 10 may determine the response to the query based on the data retrieved from second datastore comprising one or more databases or a plurality of databases, for example, one or more (or two or more) of databases 206-226. For example, controller device 10 may output a first request for data to a first database of second datastore 215 and output a second request for data to a second database of second datastore 215. For instance, the first database may be in a different rack, datacenter, office, and/or geographic region than the second database. In some instances, the first database may be configured with a different protocol, standard, or programming language than the second database. In this way, controller device 10 may perform operations to receive the data stored by disparate databases instead of administrator 12 and/or client device 11, which may reduce an amount of time administrator 12 spends configuring a query and/or may reduce an amount of data sent/received by client device 11.

Controller device 10 (or the network management system) may output the response to the query (312). For example, controller device 10 or client device 11 may generate data representing a user interface presenting the response to the query and output the data representing the user interface. In some examples, controller device 10 may receive the query from client device 11 and controller device 10 may be configured to output the response to the query to client device 11.

For example, controller device 10 may determine, using the intent graph retrieved from the first datastore 13 (e.g., graph index database 202 and/or intent graph database 204), a set of device serial numbers assigned to the subset of the plurality of network devices. In this example, controller device 10 may determine the response to the query based on the set of device serial numbers. For instance, controller device 10 may use the set of device serial numbers as an index to the second datastore 15 to access the data stored by the second datastore 15. In some examples, controller device 10 may determine that the second datastore 15 does not include data for a device serial number assigned to a network device of the subset of the plurality of network devices. In response to the determination that the second datastore 15 does not include data for the device serial number assigned to the network device, controller device 10 may determine that the second datastore 15 is missing data for the network device. In this example, controller device 10 may indicate that the second datastore 15 is missing data for the network device.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combination of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

Various examples have been described. These and other examples are within the scope of the following claims.

What is claimed is:

1. A system comprising one or more processors configured to:
   receive a query indicating a networking service;
   retrieve, from a first datastore, an intent graph for a network, wherein the intent graph comprises nodes representing components of the network and edges representing connections between the components;
   select, from a plurality of network devices of the network, both a first network device and a second network device based on a determination that the intent graph retrieved from the first datastore indicates that both the first network device and the second network device support the networking service indicated by the query, the plurality of network devices comprising at least a third network device;
   determine, based on the intent graph retrieved from the first datastore and the selection of both the first network device and the second network device, first identification information assigned to the first network device and second identification information assigned to the second network device;
   retrieve, from a second datastore and based on the first identification information, data received from the first network device;
   determine, based on the second identification information, that the second datastore does not include data for the second network device;
   determine, based on the determination that the second datastore does not include data for the second network device and the determination that the intent graph indicates that both the first network device and the second network device support the networking service indicated by the query, that the second network device is present in the network and that the second datastore is missing data for the second network device;
   determine a response to the query based on the data received from the first network device and the determination that the second network device is present in the network and that the second datastore is missing data for the second network device; and
   output the response to the query.

2. The system of claim 1,
   wherein the query further indicates filtering information, the filtering information comprising one or more of a vendor, a model, an interface, a system, or a time range; and
   wherein the one or more processors are configured to select both the first network device and the second network device further based on the filtering information.

3. The system of claim 1, further comprising a client device configured to output the query based on a user input.

4. The system of claim 1,
   wherein to receive the query, the one or more processors are configured to receive the query from a client device; and
   wherein to output the indication of the response to the query, the one or more processors are configured to output the indication of the response to the query to the client device.

5. The system of claim 1, wherein to receive the query, the one or more processors are configured to receive the query from a client device as a single application programming interface (API) request.

6. The system of claim 1, wherein to determine the response to the query, the one or more processors are configured to convert the data retrieved from the second datastore from a format of the second datastore to a format specified in the query.

7. The system of claim 6,
   wherein the format specified in the query comprises a histogram format; and
   wherein to determine a response to the query, the one or more processors are configured to convert the data retrieved from the second datastore from the format of the second datastore to the histogram format.

8. The system of claim 1, wherein to determine the response to the query, the one or more processors are configured to apply one or more functions to the data retrieved from the second datastore to generate the response to the query.

9. The system of claim 8, wherein the one or more functions comprises one or more of an average function, an interquartile range function, or a linear regression function.

10. The system of claim 1,
    wherein to determine the first identification information, the one or more processors are configured to determine a device serial number assigned to the first network device; and
    wherein the one or more processors are configured to retrieve the data received from the first network device based on the device serial number.

11. The system of claim 10, wherein to retrieve the data received from the first network device, the one or more processors are configured to use the device serial number as an index to the second datastore to retrieve the data from the second datastore.

12. The system of claim 1, wherein the first datastore comprises one or more of an intent graph database or a graph index database.

13. The system of claim 1, wherein the second datastore comprises one or more of a root cause identification (RCI) database, a computed telemetry database, a raw telemetry database, an intent-based analytics probe stage output database, an intent-based probe anomalies database, or a device-level anomaly database.

14. The system of claim 1, wherein the second datastore comprises one or more of a cluster health telemetry database, an audit event log database, a blueprint application programming interface (API), or a mutation API database.

15. A method comprising:
    receiving, by one or more processors, a query indicating a networking service;

retrieving, by the one or more processors and from a first datastore, an intent graph for a network, wherein the intent graph comprises nodes representing components of the network and edges representing connections between the components;
selecting, by the one or more processors and from a plurality of network devices of the network, both a first network device and a second network device based on a determination that the intent graph retrieved from the first datastore indicates that both the first network device and the second network device support the networking service indicated by the query, the plurality of network devices comprising at least a third network device;
determining, by the one or more processors and based on the intent graph retrieved from the first datastore and the selection of both the first network device and the second network device, first identification information assigned to the first network device and second identification information assigned to the second network device;
retrieving, by the one or more processors, based on the first identification information, and from a second datastore, data received from the first network device of the subset of the plurality of network devices of the network;
determining, by the one or more processors and based on the second identification information, that the second datastore does not include data for the second network device;
determining, by the one or more processors and based on the determination that the second datastore does not include data for the second network device and the determination that the intent graph indicates that both the first network device and the second network device support the networking service indicated by the query, that the second network device is present in the network and that the second datastore is missing data for the second network device;
determining, by the one or more processors, a response to the query based on the data received from the first network device and determining that the second network device is present in the network and that the second datastore is missing data for the second network device; and
outputting, by the one or more processors, the response to the query.

16. The method of claim 15,
wherein the query further indicates filtering information, the filtering information comprising one or more of a vendor, a model, an interface, a system, or a time range; and
wherein selecting both the first network device and the second network device is further based on the filtering information.

17. The method of claim 15, wherein a client device is configured to output the query based on a user input.

18. The method of claim 15,
wherein receiving the query comprises receiving the query from a client device; and
wherein outputting the indication of the response to the query comprises outputting the indication of the response to the query to the client device.

19. The method of claim 15, wherein receiving the query comprises receiving the query from a client device as a single application programming interface (API) request.

20. Non-transitory computer-readable storage media encoded with instructions for causing one or more programmable processors to:
receive a query indicating a networking service;
retrieve, from a first datastore, an intent graph for a network, wherein the intent graph comprises nodes representing components of the network and edges representing connections between the components;
select, from a plurality of network devices of the network, both a first network device and a second network device based on a determination that the intent graph retrieved from the first datastore indicates that both the first network device and the second network device support the networking service indicated by the query, the plurality of network devices comprising at least a third network device;
determine, based on the intent graph retrieved from the first datastore and the selection of both the first network device and the second network device, first identification information assigned to the first network device and second identification information assigned to the second network device;
retrieve, from a second datastore and based on the first identification information, data received from the first network device;
determine, based on the second identification information, that the second datastore does not include data for the second network device;
determine, based on the determination that the second datastore does not include data for the second network device and the determination that the intent graph indicates that both the first network device and the second network device support the networking service indicated by the query, that the second network device is present in the network and that the second datastore is missing data for the second network device;
determine a response to the query based on the data received from the first network device and the determination that the second network device is present in the network and that the second datastore is missing data for the second network device; and
output the response to the query.

* * * * *